United States Patent
Biondi et al.

(10) Patent No.: US 6,894,802 B1
(45) Date of Patent: May 17, 2005

(54) MULTI-JOB IMAGE BUFFERING SYSTEM AND METHOD

(75) Inventors: Mark C. Biondi, Rochester, NY (US); Joseph Michael Grassi, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/571,251

(22) Filed: May 16, 2000

Related U.S. Application Data

(60) Provisional application No. 60/185,122, filed on Feb. 25, 2000.

(51) Int. Cl.[7] ............................................. G06F 15/00
(52) U.S. Cl. ..................... 358/1.16; 358/1.12; 358/1.13; 358/1.14; 358/1.15; 358/404
(58) Field of Search ...................... 358/1.16, 1.13–1.15, 358/403–404, 444; 345/506

(56) References Cited

U.S. PATENT DOCUMENTS

| | | | | |
|---|---|---|---|---|
| 5,289,577 A | * | 2/1994 | Gonzales et al. | 345/506 |
| 6,369,914 B1 | * | 4/2002 | Miura | 358/403 |
| 6,442,302 B2 | * | 8/2002 | Klassen | 382/296 |
| 6,606,172 B1 | * | 8/2003 | Moro | 358/483 |

* cited by examiner

*Primary Examiner*—Twyler M. Lamb
(74) *Attorney, Agent, or Firm*—Oliff & Berridge, PLC

(57) ABSTRACT

A multi-job image buffering system that processes image data. The multi-job image buffering system has at least one memory device that receives an image data. A job information device associates a job information with a portion of the image data and an image identification device associates image information with the portion of the image data. The at least one memory device is capable of receiving the image data from an image source at a first data transfer rate, and transferring the image data to an image sink at a second data transfer rate.

20 Claims, 3 Drawing Sheets

MULTI-JOB IMAGE BUFFERING SYSTEM AND METHOD

This application claims the benefit of Provisional Application No. 60/185,122, filed Feb. 25, 2000.

BACKGROUND OF THE INVENTION

1. Field of Invention

This invention is directed to an image processing system. In particular, this invention is directed toward systems and methods that buffer and transmit data from an image capture device.

2. Description of Related Art

Scanners and other types of image capture devices have become ubiquitous office productivity tools for generating electronic images of physical original documents. In the past, the actual scanning of a document took longer than the transfer of data to the work station where it was to be viewed. Faster image feeders along with higher resolutions have moved the data bottleneck from the data capturing phase to the data transferring phase. Traditional means for handling slow connections include slowing down the image source, or placing the image source in a standby mode until all data has been transferred.

SUMMARY OF THE INVENTION

To reduce the bottleneck at the data transferring phase, the systems and methods of this invention use image data management software to buffer images in a memory device such as RAM, on a hard disk and disk drive, or other volatile or non-volatile storage medium. This allows an image data source, such as a scanner, to be available for capturing additional image information while the captured images are being transferred to an image data sink, such as a work station or a printer.

Additionally, the image data sink is capable of cooperating with the memory to thereby facilitate the transfer of image data from the memory to the image data sink. Therefore, the memory device allows for a buffering of image data, that can optionally be ranked, to be output to the image sink in a particular order such as in a first-in, first-out manner, a priority transfer manner or other management scheme.

Thus, a user inputs the image to the image data source. The image data corresponding to the input image is then stored in the memory. Then, while a second job is being input, or, for example, while the user is moving back to their work station or desk, the captured image data will be transferred to the image data sink, such as the user's workstation. Alternatively, another user may initiate another scan while the first job is still being transferred to the image data sink. Thus, the scanner is capable of operating at a faster rate than the data transfer rate directly to an image sink would normally allow.

In particular, the multi-job image processing system receives image data from an image source. This image data is stored in a memory device. The memory device, acting as a buffer, forwards the image data to an image data sink. Therefore, image data from multiple jobs can be received from an image data source, such as a scanner, and stored in the memory device, at the image data source's data transfer rate.

These and other features and advantages of this invention are described in or are apparent from the following detailed description of various embodiments of the systems and methods according to this invention.

BRIEF DESCRIPTION OF THE DRAWINGS

Various exemplary embodiments of this invention will be described in detail with reference to the following Figures, wherein.

DETAILED DESCRIPTION OF EXEMPLARY EMBODIMENTS

Figure 1:
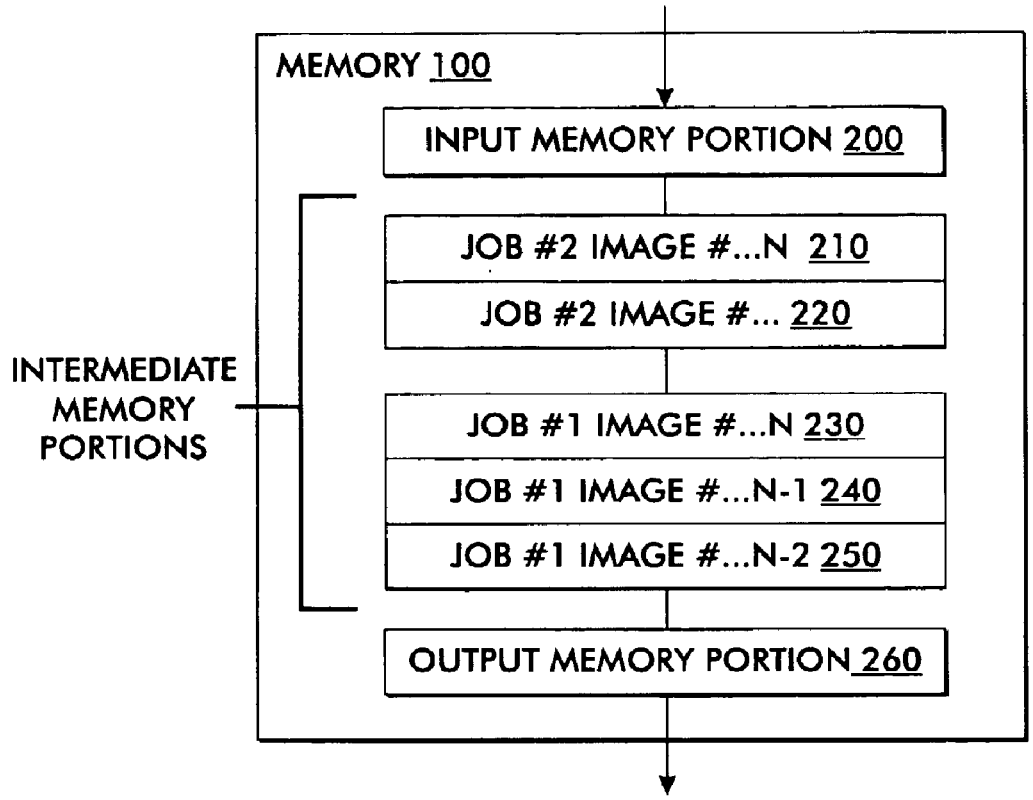
FIG. 1 is an exemplary embodiment showing a memory configuration for storing image data according to this invention.

FIG. 1 is an exemplary embodiment of one method of implementing a multi-job image buffering system. The multi-job image buffering system comprises a memory 100 that stores image data. In particular, the memory 100 may include an input memory portion 200 that receives image data, intermediate memory portions 210–250 and an output memory portion 260 that stores image data that is to be transferred to an image data sink. The images are, for example, received in a first-in first-out (FIFO) manner. The memory 100 may store image data according to various image data structures related to the image data. For example, the images may be stored on a job per job basis, on an image type basis, on a page basis, on a user basis, on a priority basis, on a time basis, on a size basis, or the like. Furthermore, while the exemplary embodiment will be described in relation to an input memory portion 200, intermediate memory portions 210–250 and an output memory portion 260, it is to be appreciated that a memory structure can be configured in any manner that allows image data received from an image data source at the image data source's data transfer output rate to be stored and transferred to an image data sink at an image data sink's data input rate.

The memory 100 is arranged such that the input image data is stored in the input memory portion 200. The input image data may have one or more of an image number corresponding to the location of the image within the job and a job number corresponding to the input job associated with the image data. The memory 100 accumulates the received image data and the one or more associated image number and job numbers as necessary to allow the image data source 30 to continue to operate. The image data is grouped according to the associated job number. Specifically, job number 2 comprising image data stored in intermediate memory portions 210 and 220, could be grouped together. Job number 1 comprising image data stored in intermediate data portions 230–250 could also be grouped together. Other methods of arranging the image data, such as randomly, by image number, by priority, by input time, by user ID or other schemes can also be used depending on, for example, the efficiency and environment in which the multi-job image processing system is implemented.

The stored image data is then transferred from a memory portion, such as output memory portion 260, to an image data sink 60 at the image data sink's 60 data input rate. The output memory portion 260 and input image memory portions 200 may be implemented as a separate memory portions, or alternatively, may be a portion of memory designated for use for the current job or image operation only.

It is preferable that the image data is transferred to the image data sink while additional images are being input from the image source or while the user is, for example, occupied with organizing the hard copy input images and returning to their desk. Thus, the memory 100 streamlines the data flow between an image source and an image sink. Thereby, for example, another user may input additional jobs to the image data source while the first job is still being transferred to the image data sink.

The image data can be transferred in a first-in first-out (FIFO) manner, or by priorities assigned by the size of the job, the user, the speed of the link to be used between the image data source 30 and image data sink 60, or other manner. Thus, later input image data may be transferred to the image data sink 60 first.

Figure 2:
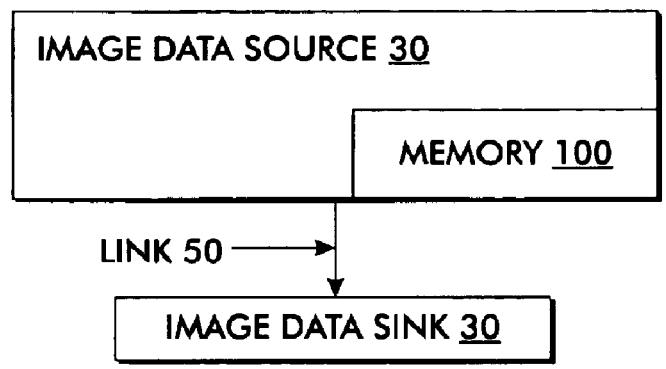
FIG. 2 is a functional block diagram showing an exemplary embodiment of the multi-job image buffering system according to this invention.

FIG. 2 is a block diagram illustrating an exemplary functional block diagram of an image processing system according to this invention. The image data source 30 includes memory 100, and is connected to the image data sink 60, via the link 50.

The image data source 30, for example, a scanner or photocopier, receives hard copy images and converts them to an electronic format. The corresponding image data may be compressed using any known or later developed industry standard or other image compression techniques. The images are then transferred to the memory 100. The memory 100 can then store the images, as illustrated in FIG. 1, prior to transfer to the image data sink 60.

Since the memory 100 can receive data at a greater rate than that of the image data sink 60, the image data source 30 can operate at its full operational capacity. Thus, the image data sink 60 has resources available to process additional image data. Then, the memory 100 transfers, via link 50, stored image data received from the image data source 30 to the data sink 60.

The memory 100 can cooperate with the image data sink 60 to facilitate transfer of stored image data. For example, the image data sink 60 can communicate with the memory 100 to request additional image data, e.g., a pull type operation. Alternatively, the memory 100 can cooperate with the image data sink 60 in a push type operation. In general, any method that allows image data to be transferred from the memory 100 to the image data sink 60 can be used with the systems of this invention.

Figure 3:
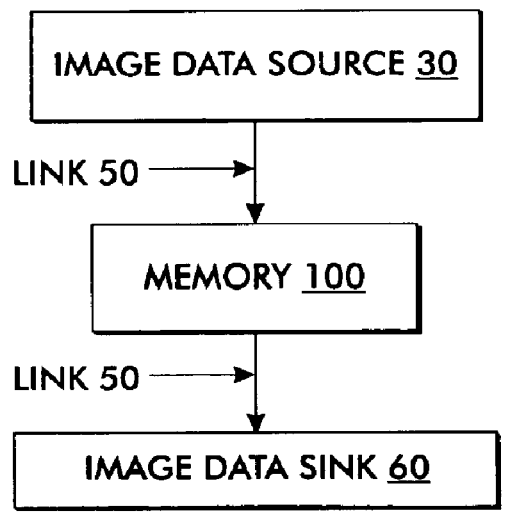
FIG. 3 is a functional block diagram showing a second exemplary embodiment of the multi-job image buffering system according to this invention.

FIG. 3 is a functional block diagram illustrating a second exemplary embodiment according to the invention. In this embodiment, the image data source 30 is separate from memory 100, and is connected to the memory via link 50. The memory 100 is then connected to the image data sink 60, via link 50.

The image data source 30, for example, a digital camera, can transfer the image data to the memory 100 via the link 50. The memory 100 then stores the image data as illustrated in FIG. 1. The image data is then transferred to the image data sink 60, via the link 50, at the image data sink's 60 data input rate.

An example of the link 50 is a SCSI (Small Computer Serial Interface) interface. Other interfaces that can be used include a serial, parallel, Universal Serial Bus (USB), Ethernet, or other known or later developed interface. The link 50 can be any wired or wireless link, or combination thereof, that supplies information between the connected elements. Thus, the link 50 can be any known or later developed element(s) that are capable of transferring information from one element to another.

The image source 30 can be any device that stores and/or generates an electronic version of an image.

Thus, the image can be a printed hard-copy version of the image, and the image source 30 can be a scanner that scans and outputs an electronic version of the image over the link 50 to the memory 100. Furthermore, the image source 30 and the memory 100 can be elements integrated into a digital photocopier.

Similarly, the image source 30 can be a server or other node on a local area network, a wide area network, an intranet, the Internet, or any other distributed network. In this case, the image is already stored on the network in electronic form.

The image sink 60 receives the output of the memory 100. Thus, the resulting image generated by the image sink 60 can be a printed or hard-copy version of the input image, and the image sink 60 can be a printer. Similarly, the image sink 60 can be a monitor which is capable of displaying an electronic version of the resulting image for viewing. Furthermore, the image source 30, the memory 100 and the image sink 60 can be elements integrated into a single device, such as a photocopier.

Similarly, the image sink 60 can be a server or other node on a local area network, a wide area network, an intranet, the Internet, or any other distributed network. In this case, the resulting image is transferred and stored on the network in electronic form.

Examples of image data sink 60 include a personal computer terminal, a network storage device, a printer, and a multifunction copier.

The memory 100 may be RAM, DRAM, a hard drive and disk, a floppy drive and disk, an optical drive and disk, a FLASH memory or the like. In general the memory can be any device capable of storing image data.

Figure 4:
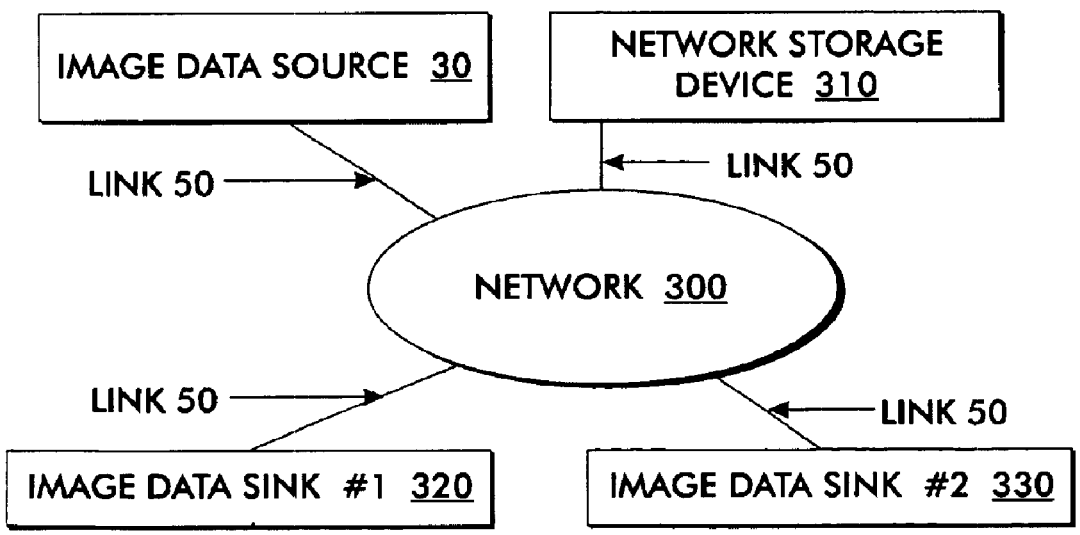
FIG. 4 is an exemplary environmental functional block diagram of the multi-job image buffering system according to this invention.

FIG. 4 is a third exemplary embodiment of a the multi-job image buffering system according to this invention. As shown in FIG. 4, the image data source 30 may be connected to network storage device 310 and one or more image data sinks 320 and 330, via network 300. The network 300 can be a publicly switched telephone network, a local area network, a wide area network, an intranet, the Internet, a wireless transmission channel, or any other distributed network, or the like.

Thus, in this exemplary embodiment, the image data may be transferred from the image data source 30 to a network storage device 310. The network storage device 310 acts as the memory 100, as discussed above, to buffer and then transfer the image data to the image data sinks 320 and 330.

The image data source 30 may be attached to the network 300 through a workstation, an adapter card, a direct connection, or any known or later developed interface. The image data source 30 may be located in a group area, or in any other location for the operation of the image source 30. Users then load the images into the image data source 30. The image data source 30 then captures images and begins transferring the image data corresponding to the images to an image data sink 60, for example image data sink #1 320, via the network storage device 310. A user can then load another image into the image data source 30. The image data source 30 will then capture any additional images and organize the images into a job without requiring that the previous images have been transferred to the image data sink 320. The image data source 30 can then transfer any previously stored job(s) to the image data sink 60, for example, to image data sink #2 330.

The transfers can begin either as soon as the data starts arriving at the network storage device 310, after waiting for the current job to finish, or any other arrangement within or after the image capture process. The images can be transferred in several ways. The images can be transferred one after the other in a serial manner. Alternatively, the images can be transferred by interleaving packets of information such that the image data is sent in a parallel manner. Furthermore, the image data can be sent in portions interleaved in a step-wise manner. The images can also be sent via multiple connections through multiple interfaces.

The images can also be sent to many destinations. The image data sink 60 may be one or more of a combination of the network storage device 310, image data sink 320 and/or the image data sink 330.

Figure 5:
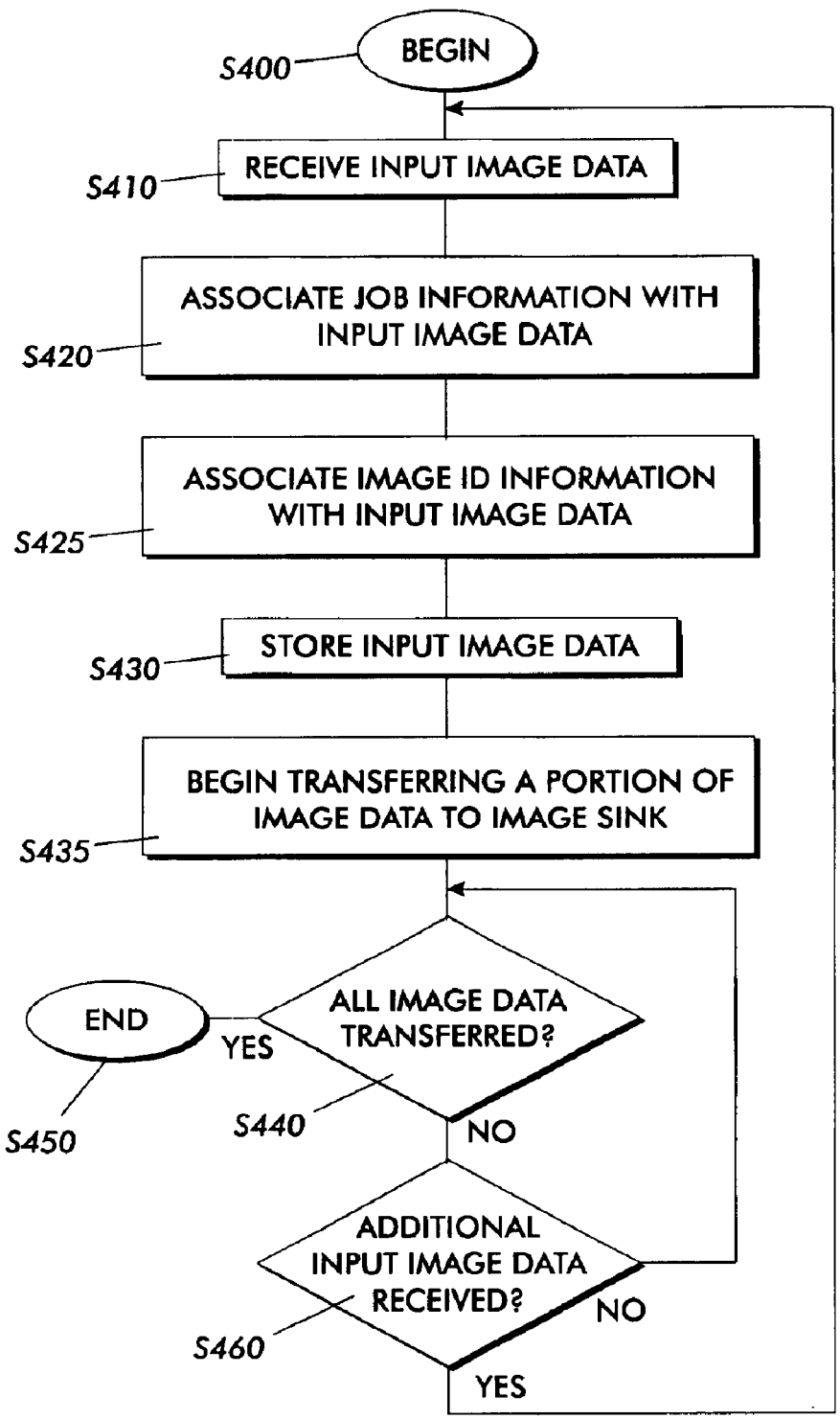
FIG. 5 is a flowchart outlining one exemplary embodiment of a method for storing and transferring image data according to this invention.

FIG. 5 shows an exemplary embodiment of a method for using memory to store image data. The control begins in step S400 and continues to step S410.

In step S410, the image data is received. The memory 100 stores the image data. Next, in step S420, job information is associated with the image data. Next, in step S425, image identification information is associated with the input image data. Control then continues to step S430.

In steps 430, the input image data is stored in memory 100 with the job information and the image identification information. Next, in steps 435, a portion of the stored image data is transferred to an image data sink. The image transfer is done in a multi-processing manner that allows the memory 100 and image data source 30 to produce, receive, transfer or manipulated image data.

Then, in step S440, a determination is made whether all of the stored image data has been transferred to the image data sink. If all the image data has been transferred, control jumps to step S450 where the control sequence ends. Otherwise, control continues to step S460.

In step S460, a determination is made whether additional image data has been received. If additional data has been received, control jumps back to step S410. Otherwise, if no additional image data has been received, control jumps back to step S440. The data is transferred from the memory 100 to the memory sink 60 at the memory sink's 60 data input rate.

As shown in FIG. 2, the multi-job image buffering system is implemented as part of the image data source 30. Alternatively, as shown in FIG. 3, the memory may be implemented as a separate device. The multi-job image buffering system can also be implemented on a special purpose computer, a programmed micro-processor or microcontroller and peripheral integrated circuit element, and ASIC or other integrated circuit, a digital signal processor, a hard-wired electronic or logic circuit such as a discrete element circuit, a programmable logic device such as a PLD, PLA, FPGA, PLA, or the like. In general, any device capable of implementing a finite state machine that is in turn capable of implementing the flowchart shown in FIG. 5 can be used to implement the multi-job image buffering system according to this invention.

The disclosed method may be readily implemented in software using object or object-oriented software development environments that provide portable source code that can be used on a variety of computer or workstation hardware platforms. Alternatively, the disclosed multi-job image buffering system may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The image processing systems and methods described above, however, can be readily implemented in hardware or software using any known or later developed systems or structures, devices and/or software by those skilled in the applicable art without undo experimentation from the function of the described provided herein together with a general knowledge of the computer arts.

Moreover, the disclosed method may be readily implemented as software executed on a programmed general purpose computer, a special purpose computer, a microprocessor or the like. In this case, the methods and systems of this invention can be implemented as a routine embedded on a scanner or as a resource residing on a server or graphics work station, such as a routine embedded in a photocopier, a printer driver, or the like. The image processing system can also be implemented by physically incorporating the systems and methods into a software and/or hardware system, such as the hardware and software system of a personal computer, a photocopier, or a dedicated information processing system.

While this invention has been described in conjunction with specific embodiments thereof, it is evident that many alternatives, modifications and variations will be apparent to those skilled in the art.

What is claimed is:

1. A system that processes image data comprising:
   at least one memory device that receives an image data;
   a job information device that associates a job information with a portion of the image data; and
   an image identification device that associates image information with the portion of the image data, wherein the at least one memory device is capable of receiving the image data from an image source at a first data transfer rate, and transferring the image data to an image sink at a second data transfer rate.

2. The system of claim 1, wherein the system allows a second or greater job information associated with a second or greater image data to be received before the first or greater job information associated with the first or greater image data has been transferred to the image sink.

3. The system of claim 1, wherein the image information comprises user information.

4. The system of claim 3, wherein the user information includes at least one of a user number, a user name, a user priority, a user workstation identification, a user home directory, a user group and a user history location.

5. The system of claim 4, wherein the system transfers the image data associated with the job information associated with a second user, before transferring the image data associated with the job information associated with a first user.

6. They system of claim 1, wherein the job information is at least one of a sequential information associated with the order the images were entered and a time information.

7. The system of claim 1, wherein the memory device is at least one of a buffer, a RAM, a DRAM, a SDRAM, a cache memory, a hard drive and disk, a floppy disk and disk drive and a flash RAM.

8. The system of claim 1, wherein the image source is at least one of a photocopier, a scanner, a digital camera and a digital video recorder.

9. The system of claim 1, wherein the image sink is at least one of a network, a floppy disk, printer, hard disk and disk drive, a tape and drive, a server, a computer and a network storage device.

10. The system of claim 1, wherein the first data transfer rate is grater than the second data transfer rate.

11. A method that processes image data comprising:

receiving an image data;

associating a job information with at least one portion of the image data; and associating image information with at least one portion of the image data, wherein the at least one memory device is capable of receiving the image data from an image source at a first data transfer rate, and transferring the image data to an image sink at a second data transfer rate.

12. The method of claim 11, further comprising receiving at least one additional image data associated with at least one additional job information before the image data associated with the job information has been transferred to the image data sink.

13. The method of claim 11, wherein the image information comprises user information.

14. The method of claim 13, wherein the user information includes at least one of a user number, a user name, a user priority, a user workstation identification, a user home directory, a user group and a user history location.

15. The method of claim 14, wherein the method transfers the image data associated with the job information associated with a second user before transferring the image data associated with the job information associated with a first user.

16. The method of claim 11, wherein the job information is at least one of a user information about a user that entered the image data, a sequential information associated with the order of the images that were entered and a time information.

17. The method of claim 11, wherein the first data transfer rate is greater than the second data transfer rate.

18. The method of claim 11, wherein the job information consists of image information.

19. The method of claim 11, wherein the method begins transferring image data to the image sink as soon as the image data begins arriving.

20. The method of claim 11, wherein the method operates in at least one of a first-in, first-out (FIFO), a last-in, first-out (LIFO), a small job first, a large job first and a user priority manner when transferring image data to the image sink.

* * * * *